(12) United States Patent
Aneha

(10) Patent No.: US 10,847,941 B2
(45) Date of Patent: Nov. 24, 2020

(54) BUS BAR UNIT OF A ROTARY ELECTRIC MACHINE

(71) Applicant: HONDA MOTOR CO., LTD., Tokyo (JP)

(72) Inventor: Misa Aneha, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/519,604

(22) Filed: Jul. 23, 2019

(65) Prior Publication Data

US 2020/0036144 A1 Jan. 30, 2020

(30) Foreign Application Priority Data

Jul. 24, 2018 (JP) ................................ 2018-138832

(51) Int. Cl.
*H01R 25/16* (2006.01)

(52) U.S. Cl.
CPC ................... *H01R 25/161* (2013.01)

(58) Field of Classification Search
CPC ...... H05K 7/1472; H05K 7/069; H05K 5/069; H01R 9/2675; H01R 25/161
USPC .......... 439/892, 901, 521, 718, 34, 212, 721
See application file for complete search history.

(56) References Cited

U.S. PATENT DOCUMENTS

| | | | | |
|---|---|---|---|---|
| 6,319,016 B1 * | 11/2001 | Juntwait | ................ | H01R 24/50 439/521 |
| 6,756,869 B2 * | 6/2004 | Takami | ................. | H01H 50/02 335/162 |
| 7,422,491 B2 * | 9/2008 | Gherardini | ........... | H01R 13/115 439/212 |
| 7,632,109 B2 * | 12/2009 | Boensch | ........... | H01L 31/02013 439/521 |
| 8,100,730 B2 * | 1/2012 | Hara | ........................ | H01R 4/64 439/721 |
| 8,784,131 B2 * | 7/2014 | Jeon | ....................... | H01R 31/06 439/212 |
| 8,936,129 B2 * | 1/2015 | Honda | .................... | B62K 11/10 180/220 |
| 8,939,795 B2 * | 1/2015 | Tsuchiya | ........... | H01R 13/6581 439/373 |
| 10,192,652 B2 * | 1/2019 | Fujiwara | ................... | H02K 3/28 |
| 10,477,717 B2 * | 11/2019 | Hasija | .................... | H05K 5/069 |

(Continued)

FOREIGN PATENT DOCUMENTS

JP        2017-079528 A        4/2017

*Primary Examiner* — Abdullah A Riyami
*Assistant Examiner* — Marcus E Harcum
(74) *Attorney, Agent, or Firm* — Paratus Law Group, PLLC

(57) ABSTRACT

A bus bar unit comprises a plurality of bus bars which include first terminal parts provided in one end portions thereof and second terminal parts provided in the other end portions thereof and in which the first terminal parts are connected to terminal parts of a coil of respective phases of a rotary electric machine; and a cover member which collectively covers the plurality of bus bars, wherein the bus bars include bent parts, and the cover member includes a cover part which covers at least a periphery of the bent parts, and a cover fixing part for attaching the cover part to a support member, and the cover member is configured so as not to be in contact with the plurality of bus bars in a state where the cover fixing part is attached to the support member.

5 Claims, 5 Drawing Sheets

(56) References Cited

U.S. PATENT DOCUMENTS

| | | | | |
|---|---|---|---|---|
| 2001/0003070 A1* | 6/2001 | Asao | ............. | H01R 9/2425 |
| | | | | 439/76.2 |
| 2012/0274163 A1* | 11/2012 | Matsumoto | ............. | H02K 5/225 |
| | | | | 310/71 |
| 2014/0354094 A1* | 12/2014 | Yazaki | ............. | H02K 3/522 |
| | | | | 310/71 |
| 2017/0104384 A1* | 4/2017 | Kurono | ............. | H02K 3/50 |
| 2017/0110929 A1 | 4/2017 | Egami et al. | | |
| 2018/0175570 A1* | 6/2018 | Houzumi | ............. | H02K 3/38 |

* cited by examiner

BUS BAR UNIT OF A ROTARY ELECTRIC MACHINE

CROSS-REFERENCE TO RELATED APPLICATIONS

This application is based on and claims priority under 35 USC 119 from Japanese Patent Application No. 2018-138832 filed on Jul. 24, 2018.

TECHNICAL FIELD

The present invention relates to a bus bar unit of a rotary electric machine.

BACKGROUND ART

In a rotary electric machine described in JP-A-2017-79528, a connection component is disclosed in which linear conductors for connecting coils of phases and a terminal block of a rotary electric machine are integrally connected by a resin mold part.

In recent years, it has been considered that a rotary electric machine and a control device such as a power converter (for example, an inverter) which converts electric power of the rotary electric machine are arranged adjacently, and the rotary electric machine and the control device are connected through bus bars.

SUMMARY

Similarly to the connection component for rotary electric machines of JP-A-2017-79528, it can be considered that when the rotary electric machine and the control device are connected through the bus bars, the bus bars are connected integrally by the resin mold part. However, it is a concern that when the bus bar is long, a manufacturing error in the bus bar, a manufacturing error in molding the resin mold part, and the like have a large effect, and it becomes difficult for terminal parts of both ends of the bus bar to be connected to the rotary electric machine and the control device.

On the other hand, when the bus bars of respective phases are formed as separate components without being integrated, the handleability of the bus bars is deteriorated. In addition, there is a problem that when the terminal parts of both ends of the bus bar are connected to the rotary electric machine and the control device, the bus bars of respective phases need to be aligned, and the process becomes complicated.

The invention provides a bus bar unit capable of easily connecting a terminal part of a bus bar to a rotary electric machine and a control device.

An embodiment of the present invention relates to a bus bar unit which includes:

a plurality of bus bars which include first terminal parts provided in one end portions thereof and second terminal parts provided in the other end portions thereof and in which the first terminal parts are connected to terminal parts of a coil of respective phases of a rotary electric machine; and a cover member which collectively covers the plurality of bus bars, the bus bars include bent parts, the cover member includes a cover part which covers at least a periphery of the bent parts, and a cover fixing part for attaching the cover part to a support member, and the cover member is configured so as not to be in contact with the plurality of bus bars in a state where the cover fixing part is attached to the support member.

According to one aspect of the invention, the cover part covers at least the periphery of the bent part. Thus, after the assembly of the bus bar unit, the plurality of bus bars can be handled as one body by the cover member. In addition, during the terminal connection operation of the bus bar unit, the plurality of bus bars can move to some extent within the cover part. Thus, even when a manufacturing error occurs in each bus bar, the first terminal part and the second terminal part of each bus bar can be connected easily.

DESCRIPTION OF EMBODIMENTS

Hereinafter, an embodiment of a bus bar unit of the invention will be described based on the accompanying drawings.

Figure 1:
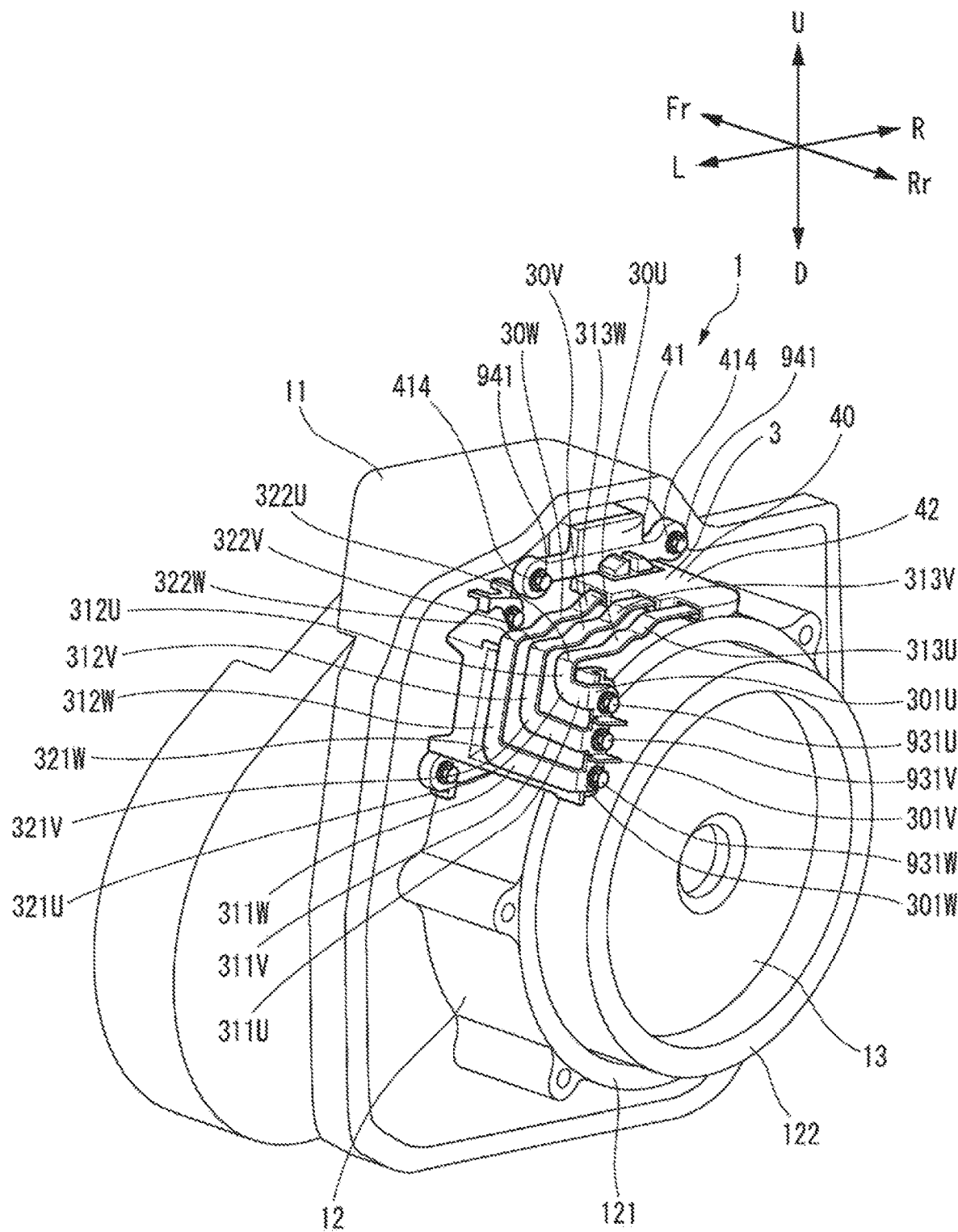
FIG. 1 is a perspective view illustrating an entire configuration of a rotary electric machine in which a bus bar unit of an embodiment of the invention is mounted.

First, the entire configuration of a rotary electric machine in which the bus bar unit of an embodiment of the invention is mounted is described based on FIG. 1. For example, a rotary electric machine 1 illustrated in FIG. 1 is a traveling motor to be mounted in a vehicle such as a hybrid vehicle and an electric vehicle. However, the configuration of the invention is not limited to the traveling motor and can be applied to a power generation motor, a motor for other purposes, or rotary electric machines (including a generator) other than a rotary electric machine for a vehicle.

In this specification, for the simplification of the description, the front, rear, right, left upper, and lower directions of the rotary electric machine 1 are defined as illustrated in the drawings such that the front direction is set to Fr, the rear direction is set to Rr, the right direction is set to R, the left direction is set to L, the upper direction is set to U, and the lower direction is set to D. However, the directions illustrated in the drawings are irrelevant to the directions of the vehicle or the like in which the rotary electric machine 1 is mounted.

As illustrated in FIG. 1, the rotary electric machine 1 includes a stator 12, a rotor 13, and a case 11 for accommodating the stator 12 and the rotor 13. The rotor 13 has an annular shape and is externally fitted to a shaft not illustrated). The stator 12 includes a stator core 121 and a coil 122 which is mounted in the stator core 121. Inside the case 11, in addition to the stator 12 and the rotor 13, a first terminal block 51 which supplies electric power to the coil 122 is provided on the upper left side, and a second terminal block 52 in which a bus bar on a power conversion device 2 side is connected is provided on the upper side. In addition, a bus bar unit 3 which electrically connects the first terminal block 51 and the second terminal block 52 is provided inside the case 11.

The stator core 121 is formed in a cylindrical shape to surround the rotor 13 from the outside in a radial direction and is fixed to the case 11 by fastening members such as bolts.

The coil 122 is a three-phase coil which is configured by a U phase, a V phase, and a W phase. The coil 122 may be a segment coil or may be a continuous winding.

The bus bar unit 3 includes three bus bars 30U, 30V, and 30W and a cover member 40 which collectively covers the three bus bars 30U, 30V, and 30W.

As illustrated in FIGS. 1 to 4, the three bus bars 30U, 30V, and 30W extend in a belt shape from the first terminal block 51 which is electrically connected to the coil 122 to the second terminal block 52 which is electrically connected to the power conversion device 2.

The three bus bars 30U, 30V, and 30W include first terminal parts 301U, 301V, and 301W; first extension parts 311U, 311V, and 311W which extend forward from the first terminal parts 301U, 301V, and 301W; first bent parts 32W, 321V, and 321W which are bent upward from the front end portions of the first extension parts 311U, 311V, and 311W; second extension parts 312U, 312V, and 312W which extend upward from the first bent parts 321U, 321V, and 321W; second bent parts 322U, 322V, and 322W which are bent rightward from the upper end portions of the second extension parts 312U, 312V, and 312W; third extension parts 313U, 313V, and 313W which extend in a right direction from the second bent parts 322U, 322V, and 322W; third bent parts 323U, 323V, and 323W which are bent forward from the right end portions of the third extension parts 313U, 313V, and 313W; fourth extension parts 314U, 314V, and 314W which extend forward from the third bent parts 323U, 323V, and 323W; fourth bent parts 324U, 324V, and 324W which are bent upward from the front end portions of the fourth extension parts 314U, 314V, and 314W; fifth extension parts 315U, 315V, and 315W which extend upward from the fourth bent parts 324U, 324V, and 324W; and second terminal parts 302U, 302V, and 302W which are connected to the fifth extension parts 315U, 315V, and 315W, respectively.

In the three bus bars 30U, 30V, and 30W, the extension parts 311U to 315U, 311V to 315V, and 311W to 315W are arranged in parallel while maintaining a predetermined interval. The arrangement of the three bus bars 30U, 30V, and 30W can be set as appropriate. However, in the embodiment, the first terminal parts 301U, 301V, and 301W are arranged in this order from the upper side to the lower side in the first terminal block 51, and the second terminal parts 302U, 302V, and 302W are arranged in this order from the right side to the left side in the second terminal block 52.

Herein, the extension parts 311U to 315U, 311V to 315V, and 311W to 315W do not necessarily extend in a straight line and may have an inclined portion in the middle thereof. The third extension parts 313U, 313V and 313W of the embodiment have forward inclined parts 313Ua, 313Va, and 313Wa which are inclined forward from the left side to the right side and upward inclined parts 313Ub, 313Vb, and 313Wb which are inclined upward from the left side to the right side.

Figure 5:
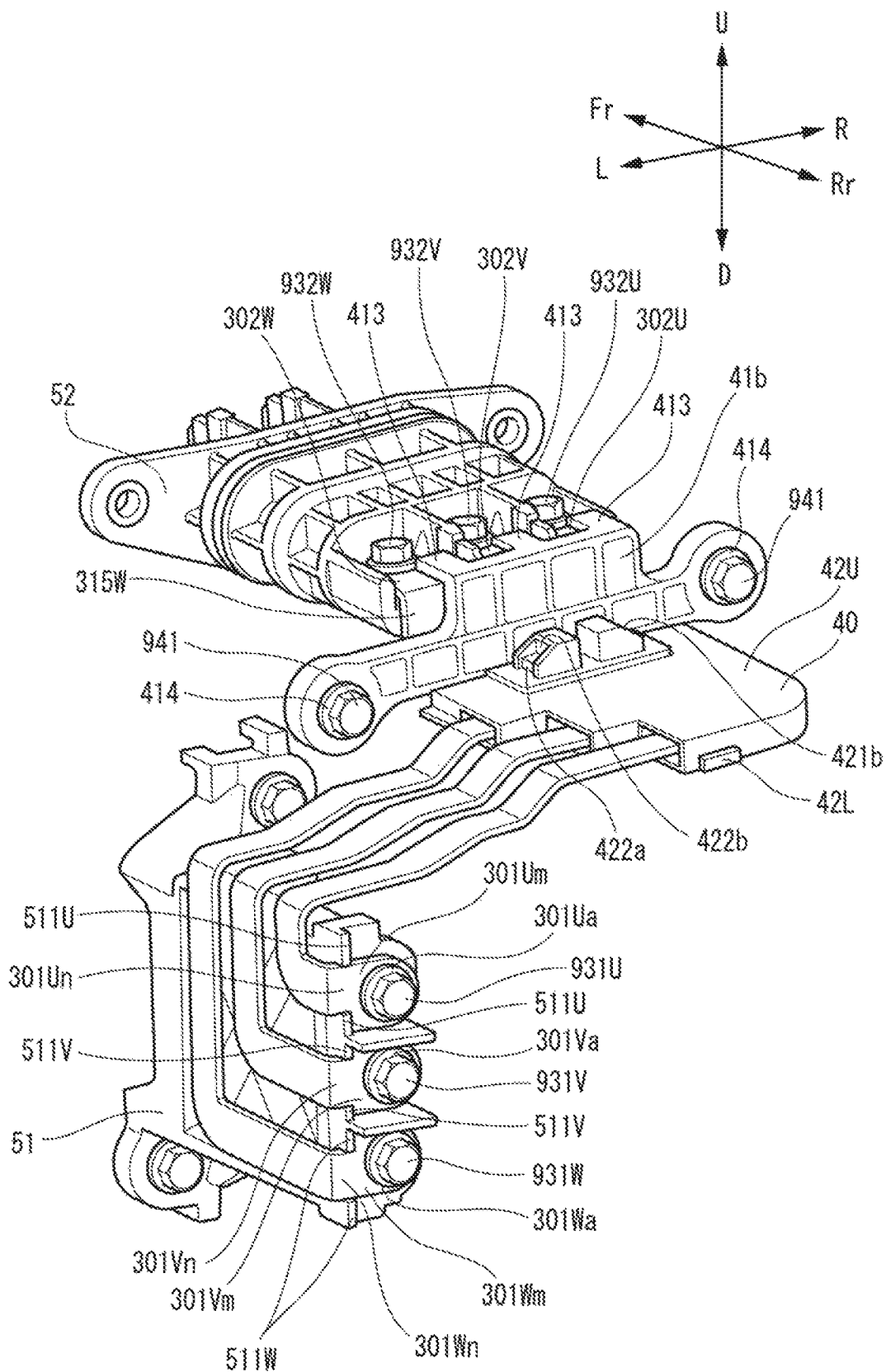
FIG. 5 is an enlarged view of main portions of FIG. 1.

As illustrated in FIG. 5, the first terminal parts 301U, 301V, and 301W have planes substantially perpendicular to the front and rear direction and include neck parts 301Un, 301Vn, and 301Wn which have the same widths as the widths of the first extension parts 311U, 311V, and 311W and are connected to the belt-shaped first extension parts 311U, 311V, and 311W, and fastening parts 301Um, 301Vm, and 301Wm which are wider than the widths of the first extension parts 311U, 311V, and 311W.

In the first terminal parts 301U, 301V, and 301W, the fastening parts 301Um, 301Vm, and 301Wm include hole parts 301Ua, 301Va, and 301Wa into which bolts 931U, 931V, and 931W are inserted. The first terminal parts 301U, 301V, and 301W are fastened to the first terminal block 51 by inserting the bolts 931U, 931V, and 931W into the hole parts 301Ua, 301Va, and 301Wa from the rear side. Further, the first terminal parts 301U, 301V, and 301W are electrically connected to the terminal parts (not illustrated) of the coil 122 of respective phases of the U phase, the V phase, and the W phase through the first terminal block 51.

The first terminal block 51 includes detent parts 511U, 511V, and 511W which abut on both widthwise ends of the neck parts 301Un, 301Vn, and 301Wn of the first terminal parts 301U, 301V, and 301W and the fastening parts 301Um, 301Vm, and 301Wm. Accordingly, when the first terminal parts 301U, 301V, and 301W are fastened to the first terminal block 51 by the bolts 931U, 931V, and 931W, the bus bars 30U, 30V, and 30W can be prevented from being rotated.

The second terminal parts 302U, 302V, and 302W have planes substantially perpendicular to the upper and lower direction and are fastened to the second terminal block 52 by inserting bolts 932U, 932V, and 932W from above. Further, the second terminal parts 302U, 302V, and 302W are electrically connected to the terminal parts (not illustrated) of the power conversion device 2 having respective phases of the U phase, the V phase, and the W phase through the second terminal block 52.

Figure 2:
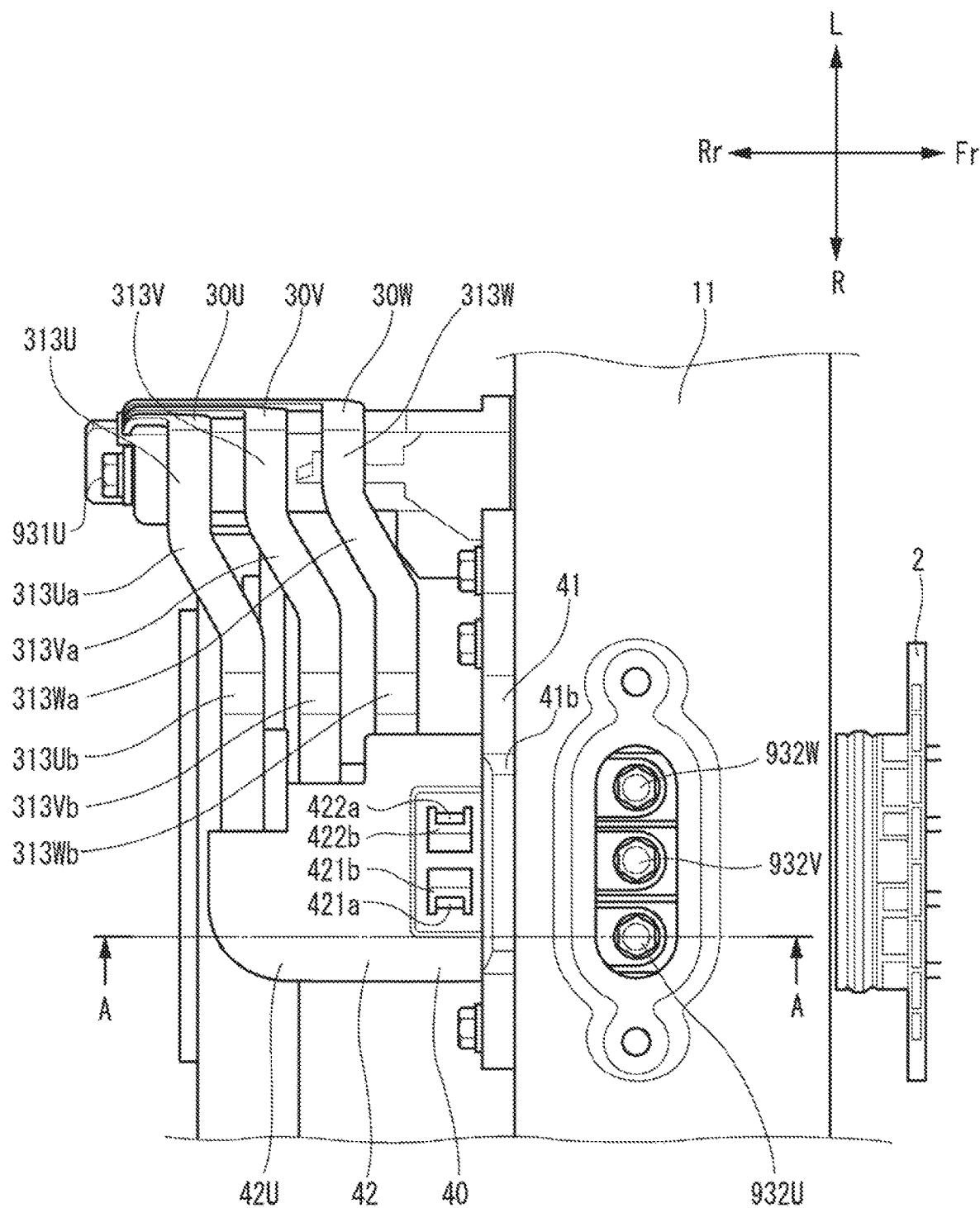
FIG. 2 is a view illustrating the bus bar unit of FIG. 1 when viewed from above.
Figure 3:
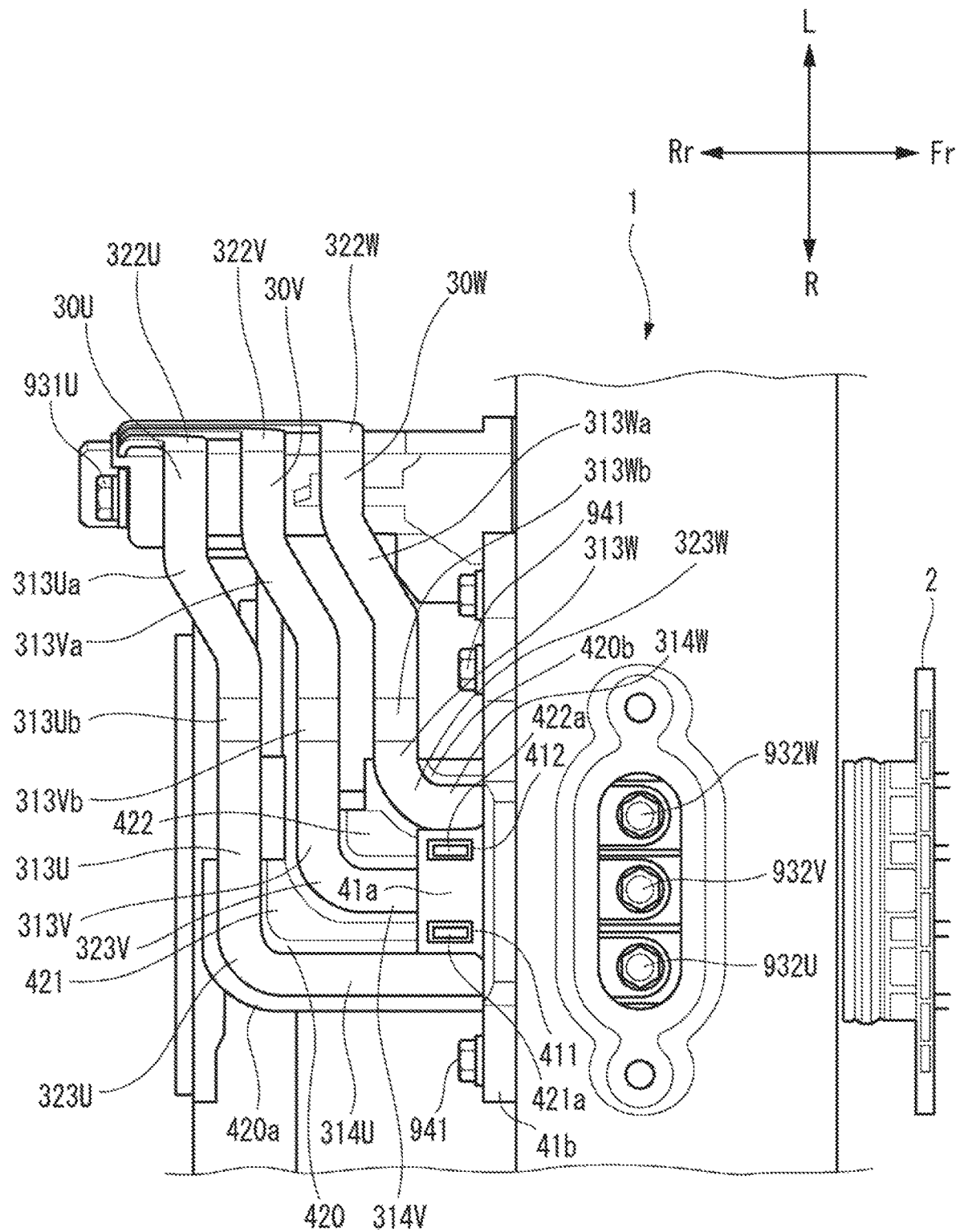
FIG. 3 is a view illustrating the bus bar unit of FIG. 2 when viewed from above in a state where the upper cover is removed.
Figure 4:
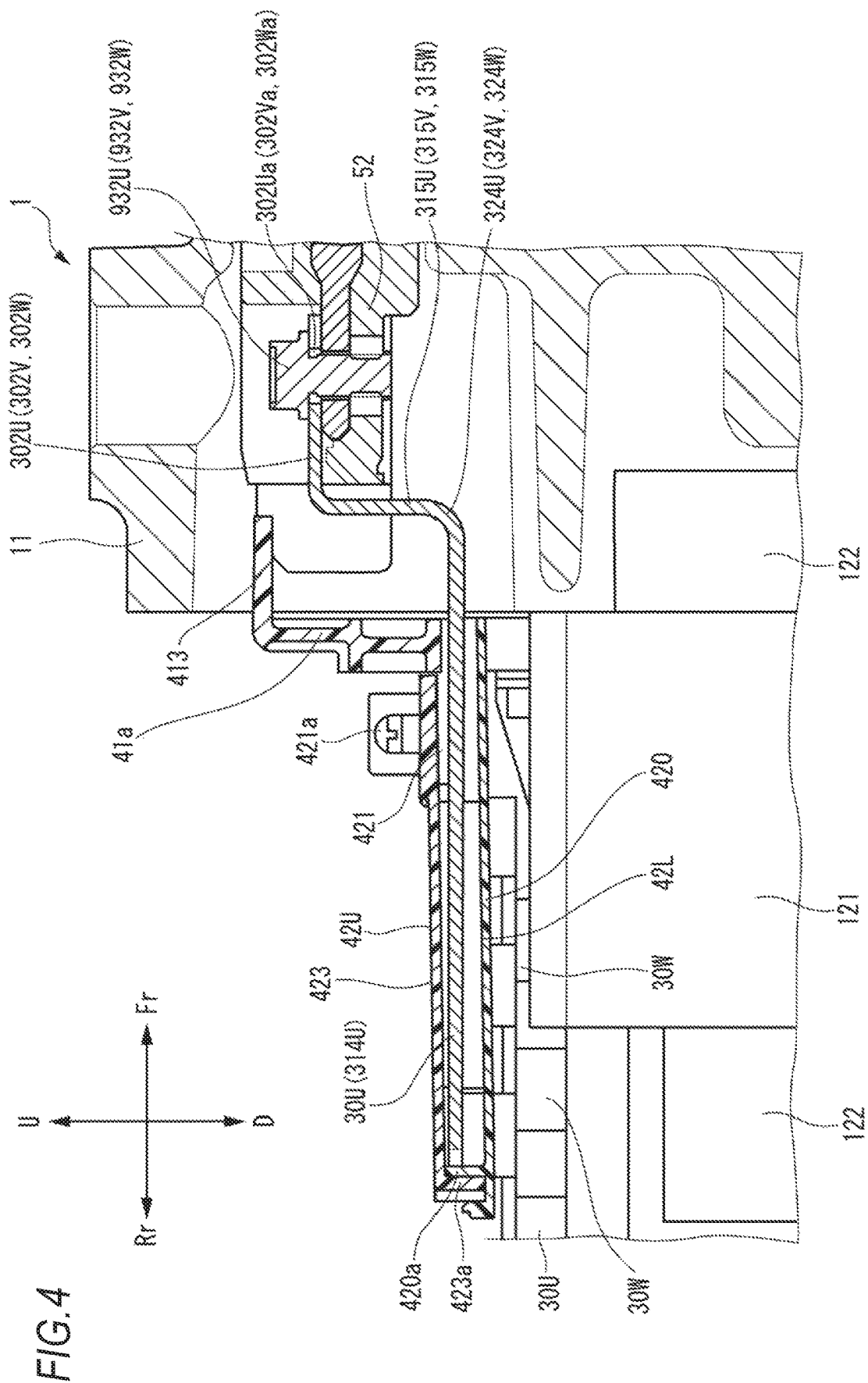
FIG. 4 is a cross-sectional view of the bus bar unit of FIG. 2 taken along line A-A.

As illustrated in FIGS. 2 to 4, the cover member 40 partially covers the right-end side of the upward inclined parts 313Ub, 313Vb, and 313Wb of the third extension parts 313U, 313V, and 313W and covers the third bent parts 323U, 323V, and 323W and the fourth extension parts 314U, 314V, and 314W. The three bus bars 30U, 30V, and 30W are arranged next to one another on the same plane inside the cover member 40.

As described above, in the bus bars 30U, 30V, and 30W, the third bent parts 323U, 323V, and 323W are covered with the cover member 40. Thus, even when the bus bars 30U, 30V, and 30W move relatively in the front and rear direction, the right and left direction, and the upper and lower direction, the third bent parts 323U, 323V, and 323W are caught in the cover member 40 and are not fallen from the cover member 40. Therefore, after the assembly of the bus bar unit 3, the three bus bars 30U, 30V, and 30W can be handled as one body by the cover member 40.

The cover member 40 includes a cover base 41 which is attached to the case 11 of the rotary electric machine 1 and a cover part 42 which covers the three bus bars 30U, 30V, and 30W. The cover part 42 includes an upper cover 42U which covers the three bus bars 30U, 30V, and 30W from above and a lower cover 42L which covers the three bus bars 30U, 30V, and 30W from below.

In the width direction of the three bus bars 30U, 30V, and 30W arranged next to one another on the same plane, the lower cover 42L has a bottom surface 420, an end wall part 420a which is erected at the right end portion and the rear end portion of the bottom surface 420, and an end wall part 420b which is erected at the left end portion of the bottom surface 420. Further, a first partition wall 421 arranged between the bus bar 30U and the bus bar 30V and a second partition wall 422 arranged between the bus bar 30V and the bus bar 30W are provided in the lower cover 42L.

A pair of engagement claws 421a and 422a extending upward are provided on the front end side of the fourth extension parts 314U, 314V, and 314W of the first partition wall 421 and the second partition wall 422.

The upper cover 42U includes an upper surface 423 which faces the bottom surface 420 of the lower cover 42L and an outer peripheral wall 423a which extends downward from the upper surface 423 and surrounds the end wall part 420a and the end wall part 420b of the lower cover 42L. Further, a pair of engagement holes 421b and 422b which are engaged with the engagement claws 421a and 422a of the lower cover 42L are provided in the upper cover 42U.

The cover base 41 includes a holding part 41a which holds the upper cover 42U and the lower cover 42L and a cover fixing part 41b which fixes the cover base 41 in the case 11 of the rotary electric machine 1.

A pair of insertion holes 411 and 412 for inserting the engagement claws 421a and 422a are provided in the holding part 41a of the cover base 41. Therefore, the pair of engagement claws 421a and 422a provided in the lower cover 42L are engaged with the pair of engagement holes 421b and 422b provided in the upper cover 42U through the pair of insertion holes 411 and 412, thereby holding the upper cover 42U and the lower cover 42L in the cover base 41.

Accordingly, the cover base 41, the upper cover 42U, and the lower cover 42L are fixed in one place, and thus the structure can be simplified.

The cover fixing part 41b of the cover base 41 includes an insertion part 413 which protrudes toward the case 11 of the rotary electric machine 1 and two fastening holes 414. Therefore, the insertion part 413 is inserted into the case 11 of the rotary electric machine 1, and bolts 941 are inserted into two fastening holes 414, thereby attaching the cover member 40 to the case 11 of the rotary electric machine 1.

Herein, the cover member 40 is configured so as not to be in contact with the three bus bars 30U, 30V, and 30W in the state of being attached to the case 11 of the rotary electric machine 1.

Accordingly, even when the bus bars 30U, 30V, and 30W vibrate, it is possible to prevent abnormal sounds generated due to the contact of the bus bars 30U, 30V, and 30W with the cover member 40.

Further, the bus bar 30U can move in the space configured by the upper cover 42U, the lower cover 42L, the end wall part 420a, and the first partition wall 421. Similarly, the bus bar 30V can move in the space configured by the upper cover 42U, the lower cover 42L, the first partition wall 421, and the second partition wall 422, and the bus bar 30W can move in the space configured by the upper cover 42U, the lower cover 42L, the second partition wall 422, and the end wall part 420b.

Accordingly, when the first terminal parts 301U, 301V, and 301W are fastened to the first terminal block 51, and when the second terminal parts 302U, 302V, and 302W are fastened to the second terminal block 52, the three bus bars 30U, 30V, and 30W can move to some extent within the cover part 42. Thus, even when the manufacturing error occurs in the bus bars 30U, 30V, and 30W, the first terminal parts 301U, 301V, and 301W and the second terminal parts 302U, 302V, and 302W can be easily fastened to the first terminal block 51 and the second terminal block 52.

The engagement claw 421a provided in the first partition wall 421 is arranged between the bus bar 30U and the bus bar 30V, and the engagement claw 422a provided in the second partition wall 422 is arranged between the bus bar 30V and the bus bar 30W. Thus, the cover base 41 can hold the upper cover 42U and the lower cover 42L with a good balance, and the non-contact state between the cover member 40 and the three bus bars 30U, 30V, and 30W can be maintained.

The above-described embodiment may be modified and improved as appropriate. For example, in the embodiment, the detent parts 511U, 511V, and 511W are provided in the first terminal block 51. However, the detent parts may be provided in the second terminal block 52 and may be provided in both of the first terminal block 51 and the second terminal block 52.

In the embodiment, the first partition wall 421 and the second partition wall 422 are provided in the lower cover 42L. However, the first partition wall and the second partition wall may be provided in the upper cover 42U.

In the embodiment, the three bus bars 30U, 30V, and 30W are arranged next to one another in this order. However, the three bus bars may be arranged in an arbitrary order.

The three bus bars 30U, 30V, and 30W are not limited to the shape of the embodiment as long as the bus bar has at least one bent part, and the bent parts are arranged next to one another on the same plane.

The description in the specification includes at least the following. Although corresponding components or the like in the above-described embodiments are indicated in the parentheses, the invention is not limited thereto.

(1) A bus bar unit (bus bar unit 3) includes:
a plurality of bus bars (bus bars 30U, 30V, and 30W) which include first terminal parts (first terminal parts 301U, 301V and 301W) provided in one end portions thereof and second terminal parts (second terminal parts 302U, 302V, and 302W) provided in the other end portions thereof and in which the first terminal parts are connected to terminal parts of a coil (coil 122) of respective phases of a rotary electric machine (rotary electric machine 1); and
a cover member (cover ember 40) which collectively covers the plurality of bus bars, wherein
the bus bars include bent parts (third bent parts 323U, 323V, and 323W),
the cover member includes a cover part (cover part 42) which covers at least a periphery of the bent parts, and a cover fixing part (cover fixing part 41b) for attaching the cover part to a support member (case 11), and
the cover member is configured so as not to be in contact with the plurality of bus bars in a state where the cover fixing part is attached to the support member.

In the bus bar unit according to (1), the cover part covers at least the periphery of the bent parts. Thus, after the assembly of the bus bar unit, the plurality of bus bars can be handled as one body by the cover member. In addition, during the terminal connection operation of the bus bar unit, the plurality of bus bars can move to some extent within the cover part. Thus, even when a manufacturing error occurs in each bus bar, the first terminal part and the second terminal part of each bus bar can be connected easily. Further, since the cover member is configured so as not to be in contact with the plurality of bus bars in a state where the cover fixing part is attached to the support member, it is possible to prevent abnormal sounds generated due to the vibration.

(2) In the bus bar unit according to (1), wherein
the cover member includes
an upper cover (upper cover 42U) which covers the plurality of bus bars from above,
a lower cover (lower cover 42L) which covers the plurality of bus bars from below, and
a cover base (cover base 41) which includes a holding part (holding part 41a) that is to hold the upper cover and the lower cover, and the cover fixing part.

According to (2), the cover base includes the holding part that is to hold the upper cover and the lower cover, and the cover fixing part. Thus, the cover member is attached to the support member in a state where the cover member is not in contact with the plurality of bus bars.

(3) In the bus bar unit according to (2), wherein the upper cover and the lower cover include engagement parts (engagement claws 421a and 422a and engagement holes 421b and 422b) which are engaged with each other, and the holding part of the cover base holds the upper cover and the lower cover by holding the engagement parts.

According to (3), since the upper cover, the lower cover, and the cover base are fixed in one place, the structure can be simplified.

(4) In the bus bar unit according to (3), wherein the plurality of bus bars are three bus bars, the three bus bars are arranged next to one another on the same plane inside the cover member, the engagement parts include a pair of engagement claws (engagement claws 421a and 422a) provided in one of the upper cover and the lower cover and a pair of engagement holes (engagement holes 421b and 422b) provided in the other of the upper cover and the lower cover, one of the pair of engagement claws is arranged between a bus bar on one side and a central bus bar among the three bus bars, and the other of the pair of engagement claws is arranged between a bus bar on the other side and the central bus bar among the three bus bars.

According to (4), one of the pair of engagement claws is arranged between the bus bar on one side and the central bus bar among the three bus bars, and the other of the pair of engagement claws is arranged between the bus bar on the other side and the central bus bar among the three bus bars. Thus, the cover base can hold the upper cover and the lower cover with a good balance, and the non-contact state between the cover member and the three bus bars can be maintained.

(5) In the bus bar unit according to any one of (1) to (4), wherein the first terminal parts and the second terminal parts of the bus bars include the hole parts (hole parts 301Ua, 301Va, and 301Wa) into which the fastening members (bolts 931U, 931V, and 931W) are inserted, and at least ones of the first terminal parts and the second terminal parts of the bus bars abut on detent parts (detent parts 511U, 511V, and 511W) provided in a terminal block (first terminal block 51).

According to (5), at least ones of the first terminal parts and the second terminal parts of the bus bar abut on the detent parts provided in the terminal block. Thus, it is possible to prevent the bus bars from being rotated while the fastening members are fastened.

What is claimed is:

1. A bus bar unit comprising:
    a plurality of bus bars which include first terminal parts provided in one end portion thereof and second terminal parts provided in another end portion thereof and in which the first terminal parts are connected to terminal parts of a coil of respective phases of a rotary electric machine; and
    a cover member which collectively covers the plurality of bus bars, wherein
    the cover member includes a cover part which covers at least a periphery of the bus bars, and a cover fixing part for attaching the cover part to a support member,
    the cover member further includes:
        an upper cover which covers the plurality of bus bars from above;
        a lower cover which covers the plurality of bus bars from below; and
        a holding part that is to hold the upper cover and the lower cover,
    the upper cover and the lower cover have engagement parts which are engaged with each other,
    the holding part of the cover base holds the upper cover and the lower cover by holding the engagement parts,
    the cover member is configured so as not to be in contact with the plurality of bus bars in a state where the cover fixing part is attached to the support member,
    the bus bars include bent parts,
    the plurality of bus bars are arranged next to one another on the same plane inside the cover member,
    the engagement parts include a pair of engagement claws provided in one of the upper cover and the lower cover and a pair of engagement holes provided in the other of the upper cover and the lower cover,
    the plurality of bus bars are three bus bars,
    the three bus bars are arranged next to one another on the same plane inside the cover member,
    one of the pair of engagement claws is arranged between a bus bar on one side and a central bus bar among the three bus bars, and
    the other of the pair of engagement claws is arranged between a bus bar on another side and the central bus bar among the three bus bars.

2. The bus bar unit according to claim 1, wherein the cover member further includes
    a cover base which has the holding part and the cover fixing part.

3. The bus bar unit according to claim 1, wherein
    the first terminal parts and the second terminal parts of the bus bars include hole parts into which fastening members are inserted, and
    at least ones of the first terminal parts and the second terminal parts of the bus bars abut on detent parts provided in a terminal block.

4. The bus bar unit according to claim 2, wherein
    the first terminal parts and the second terminal parts of the bus bars include hole parts into which fastening members are inserted, and
    at least ones of the first terminal parts and the second terminal parts of the bus bars abut on detent parts provided in a terminal block.

5. The bus bar unit according to claim 1, wherein
    the first terminal parts and the second terminal parts of the bus bars include hole parts into which fastening members are inserted, and
    at least ones of the first terminal parts and the second terminal parts of the bus bars abut on detent parts provided in a terminal block.

* * * * *